Figure 1:
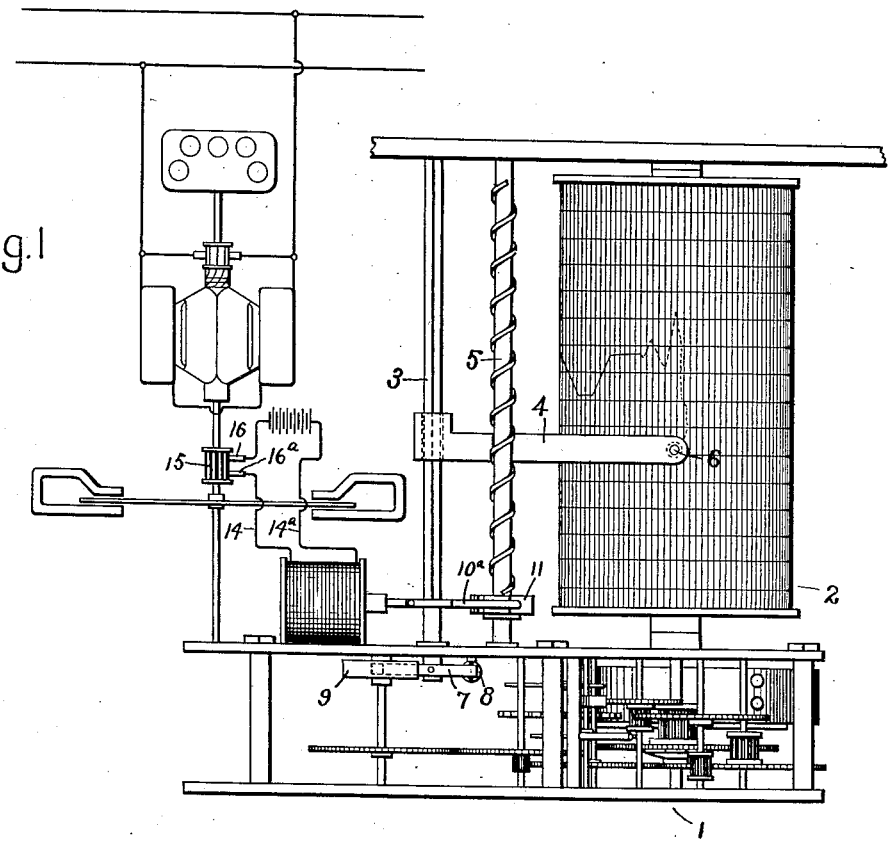

L. T. ROBINSON & C. C. BADEAU.
SPEED RECORDER AND CURVE DRAWING INSTRUMENT.
APPLICATION FILED JULY 29, 1901.

919,640.  Patented Apr. 27, 1909.

Witnesses.
John Ellis Glenn.
Benjamin R. Hill.

Inventors.
Lewis T. Robinson,
Charles C. Badeau.
by Albert G. Davis
Atty.

UNITED STATES PATENT OFFICE.

LEWIS T. ROBINSON AND CHARLES C. BADEAU, OF SCHENECTADY, NEW YORK, ASSIGNORS TO GENERAL ELECTRIC COMPANY, A CORPORATION OF NEW YORK.

SPEED-RECORDER AND CURVE-DRAWING INSTRUMENT.

No. 919,640.  Specification of Letters Patent.  Patented April 27, 1909.

Application filed July 29, 1901. Serial No. 70,020.

*To all whom it may concern:*

Be it known that we, LEWIS T. ROBINSON and CHARLES C. BADEAU, citizens of the United States, residing at Schenectady, county of Schenectady, State of New York, have invented certain new and useful Improvements in Speed-Recorders and Curve-Drawing Instruments, of which the following is a specification.

This invention relates primarily to means for leaving a permanent record of a moving indicator of speed, energy or other changing characteristics of machines by drawing a curve indicating the fluctuations; for example, in the measurement of electric energy, instruments are provided by which the volume of energy or some of its functions is indicated in instantaneous values, as in ammeters and voltmeters, or a total of energy passing in a definite time, as recording wattmeters. It is desirable however, that a central station for instance should have a record in the form of a curve showing the fluctuations of energy from time to time. In other types of apparatus, as for example those which indicate the speed of moving parts, it is desirable to have a permanent record which will indicate the speed at any desired instant. In devices commonly employed to indicate such values the recording device comprises a marker or stylus in continuous engagement with the paper or other recording surface; this involves an undesirable factor, namely friction of the stylus, which is so considerable as to preclude devices of this design from use for measurement where great accuracy is necessary or where the forces to be measured are delicate. Our invention provides an apparatus which accomplishes these ends without interference of the stylus movement with accuracy of indication. Its essential feature consists in a continuously moving apparatus, as for example a train of clockwork by which the recording-surface is maintained in uniform motion, and means for indenting or marking the recording surface at definite periodical intervals at a point governed in position by the energy or speed to be recorded.

Another distinctive feature consists in maintaining the stylus out of contact with the recording surface except at periodic instants, thereby permitting it to freely obey the control of delicate governing apparatus, and providing means for making a mark on the record at such instants, a succession of such marks indicating the variations of the controlling apparatus.

In carrying out the invention we provide a rotating drum on which is carried the record-sheet and the time-device by which a marker in coöperative relation to the recording surface is brought against the latter and then shifted back to the initial position or datum-line. We provide also means governed by the energy or speed to be recorded for shifting the marker in the direction of an ordinate on the datum-line after reaching its initial position until the instant determined by the timing device when the marking should occur.

Our invention embodies various other features, the novelty of which will be hereinafter more fully described and will be definitely indicated in the claims appended to this specification.

In the accompanying drawing which illustrates our invention is shown a curve-drawing instrument as applied to a recording wattmeter. This particular application is illustrated, merely by way of example, as the invention is applicable to numerous other uses in curve-drawing, to indicate the behavior of machines, which will readily occur to skilled engineers.

Figure 2:
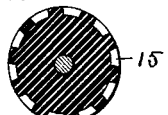
Figure 3:
Figure 4:
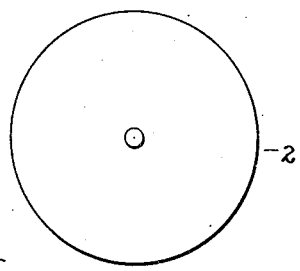
Figure 4:
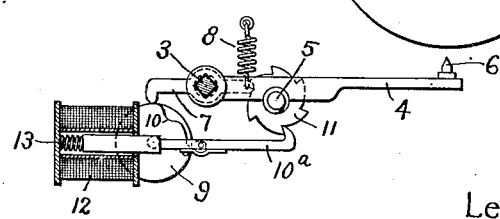

Figure 1 represents an organization partly in diagram embodying our improvements; Figs. 2 and 3 are detail views of an interrupting device employed to shift the marker, and Fig. 4 is a detail view showing the relation of the marker to the record surface and the means for operating it.

1 represents a clock movement or other timing device, on one of the main arbors of which is mounted a drum 2 to which may be secured in any desired manner a record-sheet upon which the desired curve is to be drawn. Parallel to the axis of the drum is a guide 3, square or prismatic in section, upon which is slidingly mounted a marker 4. The guide is trunnioned in a fixed frame so as to be capable of a rocking movement, and the marker has a screw-thread cut in one face so as to engage a worm-shaft 5. The marker carries at its free end a pencil or stylus 6. On the end of the square shaft or guide 3 is fixed a lever 7, one end of which is connected to a spring 8 and the other end bears upon a cam 9 driven by the clockwork.

The cam is provided with a depression at one or more points, as indicated at 10, of sufficient depth to rock the marker out of engagement with the worm-shaft. The beginning of the depression 10 is of greater depth than the other parts, thereby shifting the stylus into contact with the record-sheet, and after it has left its trace raising it away from the same but still leaving the thread cut in it out of engagement with the worm, thus freeing the marker and permitting it to slide on the squared guide 3 under the influence of gravity or a control-spring back to its starting position.

We effect a rotation of the worm-shaft 5 by means of a pawl 10ª and ratchet 11, the latter of which is mounted on the worm-shaft, movement of the pawl being effected by the controlling apparatus. We prefer to employ for this purpose an electro-magnetic device, the governing circuit of which is closed at periods depending upon the speed of movement of the controlling apparatus. For this purpose a solenoidal magnet 12 may be employed, the core of which is connected with the pawl 10ª and is normally retracted by a spring, as indicated at 13 in Fig. 4. The magnet is periodically energized by a circuit 14—14ª which may be derived from any suitable source and which includes a circuit-controller governed by the controlling apparatus. This circuit-controller may be a contact-device mounted on a revolving shaft of the apparatus, which periodically closes the circuit. As shown in the drawings, we have provided an insulating cylinder having a plurality of circularly arranged contact-bars 15 spaced at equal circumferential distances apart and adapted to bridge an electric connection between two contact-brushes 16—16ª controlling the circuit of the magnet. The construction of this circuit-closing device is somewhat similar to a commutator, and will be fully understood from an inspection of Figs. 2 and 3.

In the case of a wattmeter this may be mounted in the armature shaft, as indicated in Fig. 1, the number of contact plates 15 being varied according to the speed of the instrument or machine whose curve is to be drawn, the pitch of the worm 5 and the number of teeth on the ratchet. With this organization, so long as the wattmeter is in operation, intermittent impulses will be delivered to the solenoid, the frequency of which depends upon the speed of the wattmeter, and each of these impulses shifts the ratchet wheel the distance of one tooth, thereby rotating the worm-shaft and shifting the marker away from the zero-line of the recording surface. After an interval of every few seconds the cam 9 will rock the marker against the record-sheet and then withdraw it without permitting engagement with the worm-shaft permitting it to drop to the zero-point on the curve to be again raised by the impulses delivered to the magnet. Thus it will be seen that points will be marked on the record-sheet at regular time-intervals and will vary in height above the zero line according to the speed of the apparatus during such intervals, thereby producing a wavy or irregular dotted line which is a correct record of the variations of current through the instrument. The raising of the marker may be effected by other means than the periodic impulses herein described; for example, it might be directly shifted by means controlled by the volume of energy during a periodic interval, as for example, by a motor or equivalent device dependent upon such energy. Numerous methods may be employed for this purpose which we deem within the scope of our invention and which will occur to skilled engineers.

Having thus described our invention, what we claim as new and desire to secure by Letters-Patent of the United States, is,—

1. In a recording instrument, the combination with a support for a record sheet, of a guide extending across the record sheet, a stylus slidably mounted on said guide, an actuating mechanism for moving said stylus along the guide against a restraining force, said guide and said mechanism being relatively movable to release the stylus, and means for relatively moving said guide and said mechanism at intervals to release the stylus and bring it into contact with the record sheet.

2. In a recording instrument, the combination with a support for a record sheet, of a movable guide extending across the record sheet, a stylus movably mounted on said guide, an actuating mechanism for engaging said stylus to move it along the guide against a restraining force, and means for periodically moving the guide to disengage the stylus from the actuating mechanism and bring it into contact with the record sheet.

3. In a recording instrument, the combination with a support for a record sheet, of a rock shaft extending across the record sheet, a stylus splined on said shaft to engage the record sheet when said shaft is rocked in one direction, an actuating mechanism for engaging said stylus when said shaft is rocked in the other direction to move the stylus along said shaft against a restraining force, and means for rocking said shaft at regular time intervals.

4. In a recording instrument, the combination with a support for a record sheet, of a rocking guide extending across the record sheet, a stylus splined on said guide, an actuating mechanism for engaging said stylus to move it along the guide against a restraining force, and means for rocking the guide to shift the stylus from the actuating mechanism into contact with the record sheet and back to an intermediate position permitting free return to zero position.

5. In a recording instrument, the combination of a support for the record sheet, of a stylus actuating mechanism, a stylus normally in engagement with said mechanism, said stylus being mounted to move across said record sheet and to rock at any point in its travel out of engagement with said mechanism into contact with the record sheet, and a controlling cam shaped to rock said stylus to free it from the actuating mechanism and bring it into contact with the record sheet and then move it back to an intermediate position in which said stylus is free to return to zero position.

6. In a recording instrument, the combination with a support for a record sheet, of a worm shaft extending across the record sheet, means for driving said shaft at a speed dependent on the quantity to be measured, a stylus normally out of contact with the record sheet driven from the zero position across the record sheet when in engagement with said shaft, and means for periodically lifting the stylus out of engagement with said worm shaft into contact with the record sheet.

7. In a recording instrument, the combination with a support for a record sheet, of a worm shaft extending across the record sheet, means for driving said shaft at a speed dependent on the quantity to be measured, a rock shaft parallel to said worm shaft, a stylus splined on said rock shaft and driven when in engagement with said worm shaft across and out of contact with the record sheet against a retarding force, and means for periodically actuating said rock shaft to rock the stylus free from the worm shaft into engagement with the record sheet and then into position permitting free movement under said restraining force.

In witness whereof, we have hereunto set our hands this 26th day of July, 1901.

LEWIS T. ROBINSON.
CHARLES C. BADEAU.

Witnesses:
   BENJAMIN B. HULL,
   EDWARD WILLIAMS, Jr.